United States Patent

Lauwers et al.

Patent Number: 6,021,926
Date of Patent: Feb. 8, 2000

[54] PACKAGED FOAMING COMPOSITION

[75] Inventors: Hilde Antoinette Elza Lauwers, Lier; John Neil Rogers, Brussels; Peter Maurits Maria Van Geert, Kraainem, all of Belgium

[73] Assignee: The Procter & Gamble Company, Cincinnati, Ohio

[21] Appl. No.: 08/983,208

[22] PCT Filed: Jul. 10, 1996

[86] PCT No.: PCT/US96/11513

§ 371 Date: Jan. 13, 1998

§ 102(e) Date: Jan. 13, 1998

[87] PCT Pub. No.: WO97/02999

PCT Pub. Date: Jan. 30, 1997

[30] Foreign Application Priority Data

Jul. 13, 1995 [EP] European Pat. Off. ............... 95870084
Mar. 6, 1996 [EP] European Pat. Off. ............... 96870028

[51] Int. Cl.[7] .................................................. B65D 83/30
[52] U.S. Cl. .......................................................... 222/402.1
[58] Field of Search .............................. 222/402.1, 402.13

[56] References Cited

U.S. PATENT DOCUMENTS

| | | | |
|---|---|---|---|
| 3,741,902 | 6/1973 | Barrett | 510/283 |
| 3,744,678 | 7/1973 | Beres et al. | 222/205 |
| 3,841,532 | 10/1974 | Gores | 222/205 |
| 4,199,482 | 4/1980 | Renaud et al. | 510/284 |
| 4,243,543 | 1/1981 | Guilbert et al. | 510/234 |
| 4,288,339 | 9/1981 | Wilsberg | 510/283 |
| 4,336,024 | 6/1982 | Denissenko et al. | 8/142 |
| 4,420,099 | 12/1983 | Pizzurro et al. | 222/205 |
| 4,652,389 | 3/1987 | Moll | 510/279 |
| 4,655,959 | 4/1987 | Stopper | 252/305 |
| 4,667,855 | 5/1987 | Holleran | 222/402.1 X |
| 4,749,516 | 6/1988 | Brusky | 510/248 |
| 4,780,100 | 10/1988 | Moll | 8/137 |
| 4,877,556 | 10/1989 | Wilsberg et al. | 510/283 |
| 4,901,891 | 2/1990 | Goncalves | 222/402.13 |
| 4,954,286 | 9/1990 | Supulveda et al. | 510/284 |
| 5,334,325 | 8/1994 | Chaussee | 510/120 |
| 5,925,608 | 7/1999 | Spruyt et al. | 510/276 |

*Primary Examiner*—Kenneth Bomberg
*Attorney, Agent, or Firm*—James C. Vago; T. David Reed

[57] ABSTRACT

A packaged product is provided. The packaged product includes a container having an opening closed by a valve and a foaming detergent composition which is stored within the container. The valve has an open position for dispensing the foaming composition from the container and a closed position for preventing escape of the foaming composition from the container; The foaming detergent composition has less than 25% by weight of water. A propellant gas, such as carbon dioxide, nitrous oxides, or mixtures thereof, is stored within the container. A nozzle is attached to the container which has a channel and a discharge opening. The channel interconnects the opening of the container and the discharge opening of the nozzle. The channel is straight, continues and uninterrupted along its length between the opening of the container and the discharge opening of the nozzle such that greater than about 80% of said foaming detergent composition can be discharged from the container during use.

4 Claims, 1 Drawing Sheet

PACKAGED FOAMING COMPOSITION

The present invention relates to a packaged product comprising a foaming composition and a propellant gas packaged within a container. In particular the packaged product is a foam dispensing aerosol container.

It is well known in the aerosol industry that there is a need to move out of HFC propellants on account of their environmental profile. The replacement choice has mostly been the low molecular weight hydrocarbons such as propane, butane, pentane, hexane, etc., but these are flammable gases which may not always be suitable for use inside confined appliances with potential ignition sources. For these reasons, the industry is seeking a move to more environmentally friendly chemicals.

Replacing the organic propellants, such as those listed above, by gaseous propellant gases presents new problems. Unlike more conventional liquifiable organic propellant gases, gases such as carbon dioxide and nitrous oxide cannot be liquefied at the pressures obtainable in an aerosol container (i.e. typically 10 to 12 bar maximum). As a foaming composition is progressively emptied out of the aerosol canister the carbon dioxide or nitrous oxide in the headspace cannot be replenished as would be the case with liquifiable propellants, and consequently the pressure in the headspace drops. If the headspace pressure becomes too low it will no longer be possible to dispense a foam from the aerosol container.

Attempts to address this problem have included the use of microporous structures to adsorb gaseous propellant gas (such as carbon dioxide), thereby providing a "reservoir" of gas from which the headspace pressure can be replenished.

EP-A 0 385 773, published on Sep. 5, 1990, discloses a gas storage system comprising a polymeric material, such as hydrogel, having microvoids functioning as interstitial stores for gas.

DD-A 246 784, published on Jun. 17, 1987, discloses cosmetic and pharmaceutical foam aerosols containing 5–50% of CO2-charged aluminosilicate. It is claimed that filling rates are high, pressure peaks are avoided, and pressure remains substantially constant up to complete emptying of the aerosol package.

EP-A677 577, published on Oct. 18, 1995, discloses a foaming detergent composition for cleaning textile fabrics which may be dispensed with the aid of propellants including hydrofluorocarbons (HFCs) or low molecular weight hydrocarbons.

Foaming compositions which are concentrated in terms of active components, and have a correspondingly low water content, and therefore a high viscosity, may not be suitable for dispensing with carbon dioxide or nitrous oxide because the energy stored in the propellant is not sufficient to completely empty the aerosol container. Furthermore microporous gas adsorbent agents may be undesirable for economic reasons.

The present invention is concerned with a means of delivering a concentrated foam of uniform density without the need for microporous gas adsorbent agents. Various apparatus for delivering foams are known in the prior art, as for example U.S. Pat. No. 5,364,031 issued on Nov. 15, 1994 entitled "Foam Dispensing Nozzles and Dispensers Employing Said Nozzles". The Precision Valve Company (Valve Precision in France) supplies a range of nozzle assemblies for various applications including shaving foams and carpet cleaners under various trade names including City®, Montego®, Power Jet®, Nevada®, Vulcan® and Visco®. Nozzles which disperse the foam both horizontally and vertically (when the container is held upright) are available. Metering nozzles which dispense a predetermined amount of foam are also available. Metering valves are disclosed in WO9108965 (Precision Valve Co) and EP-A 616953 (3M Co). However, the applicant has found that the increase of the foam density when discharging a foaming product with a gaseous propellant cannot be sufficiently controlled with these nozzles.

It has been found that foams discharged with gaseous propellants tend to exhibit a greater increase in foam density throughout the life of the aerosol container compared to foams discharged with liquid propellants. Indeed, it is observed that the foam density of the foaming product when the aerosol package is almost empty is higher than the foam density of the product first discharged when the aerosol container was still full. In extreme cases, the product is discharged more in liquid form than as a foam when the aerosol container is almost empty. Such an extreme density increase into a liquid of the foaming product can result in adverse consumer effects such as liquid product running through the fingers of the consumer and decreased dosing control. Therefore, the increase of foam density of the discharged product throughout the life of the aerosol container should be minimised. Without wishing to be bound by any theory, it is believed that this increase in foam density is due to the drop of the pressure of the gaseous propellant. The applicant has found that the undesirable increase of foam density is worse when the nozzle creates turbulence during the discharging of the product.

It is therefore an object of the present invention to provide an aerosol package comprising a foaming product, a gaseous propellant and a nozzle therefor in which the increase of the foam density when discharging a foaming product with a gaseous propellant can be minimised.

SUMMARY OF THE INVENTION

The present invention is an aerosol package comprising a container and a nozzle. The container comprises an opening closed by a valve. The valve has an open position and a closed position. The container contains a propellant and a product. The product foams when discharged from the container. The nozzle comprises a discharge opening and a channel connecting the opening of the container and the discharge opening of the nozzle when the valve is in the open position. Furthermore, the propellant is a gaseous propellant and the channel is straight, continuous and uninterrupted all along its length between the opening of the container and the discharge opening of the nozzle.

In a preferred embodiment of the invention a packaged product is provided comprising a foaming composition comprising a surfactant system and wherein the foaming composition comprises less than 25% by weight, preferably less than 15% by weight, of water; a propellant gas; and a container; such that the foaming composition may be completely dispensed from a container by an environmentally-friendly (inorganic) propellant gas.

A further preferred embodiment of the invention is to provide a low water composition which reduces the formation of $HCO_3$-ions when carbon dioxide is the propellant gas. The formation of these ions results in lower propellant gas efficiency because the carbon dioxide is converted into bicarbonate.

A further preferred embodiment of the invention is to provide a low water composition suitable for maintaining enzymes in a stable state. In particular the compositions of the present invention are suitable for use with detergent enzymes.

DETAILED DESCRIPTION OF THE INVENTION

Figure 1:
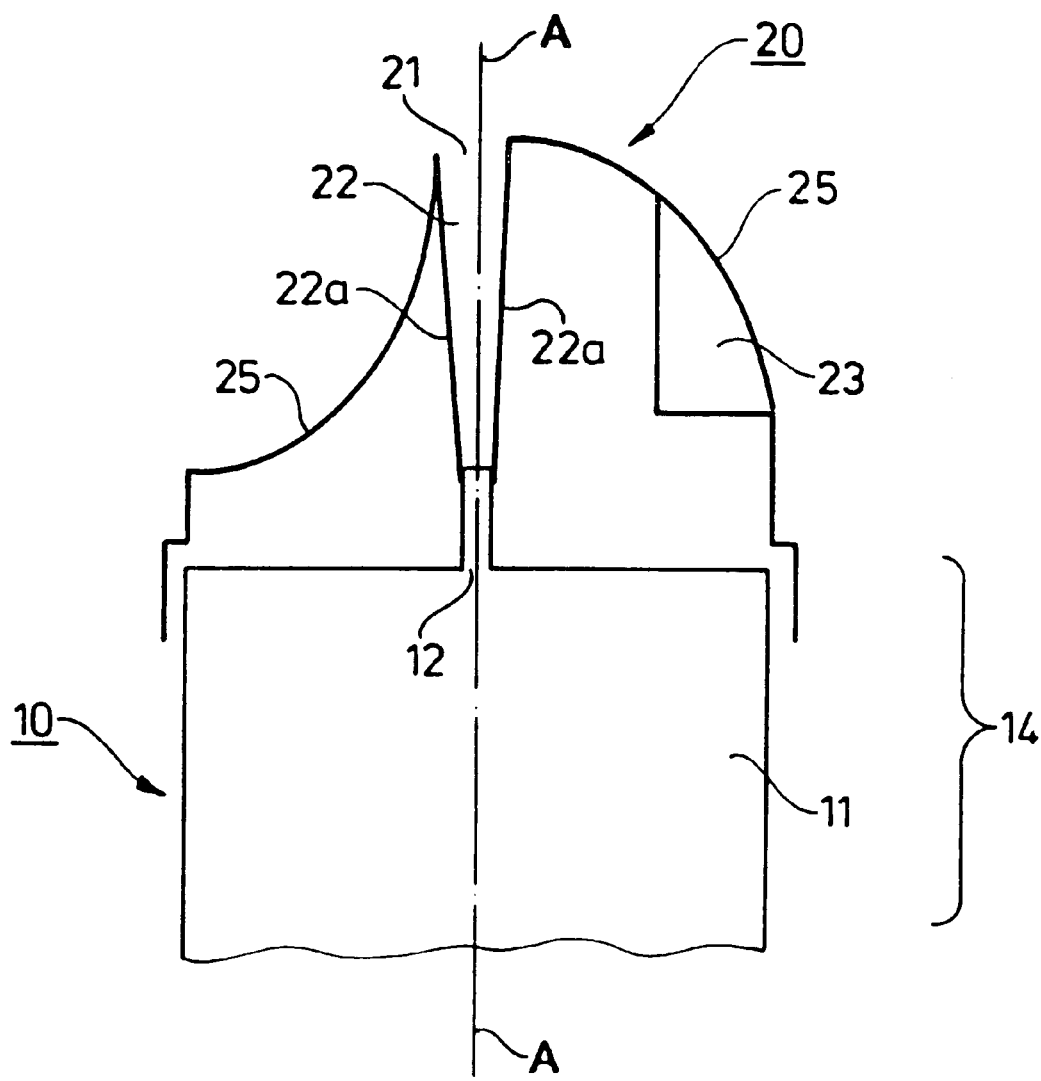
FIG. 1 is a schematic cross sectional view of the nozzle of the aerosol package according to the present invention.

Foam is a coarse dispersion of gas in a relatively small amount of liquid. The foams of the present invention are a continuous liquid phase comprising a composition, and a dispersed phase comprising a gas. Typically, the gas "bubbles" of the dispersed phase can vary in size from 50 micrometers to several millimeters.

In general, the quality of the foam is determined by assessing various foam quality attributes, such as: 1) the appearance of the foam as it is determined by the uniformity of the bubble size distribution, as well as by the actual bubble sizes, wherein small and uniformly sized bubbles are generally preferred; 2) the thickness of the foam as it is determined by the apparent foam viscosity, wherein a greater apparent foam viscosity is generally preferred; 3) the density of the foam which is preferably less than 250 g/l, more preferably less than 150 g/l, and most preferably less than 100 g/l; and 4) the drainage of the liquid from the foam upon standing on a solid surface, wherein slow drainage of the liquid is generally preferred.

As shown in FIG. 1, the aerosol package according to the present invention comprises a sealed container or can (10, only partially shown) and a nozzle (20). The container is hollow body (11) which may be made from any material, preferably aluminium, tin-plate, plastics including polyethylene terephthalate (=PET), oriented polypropylene (=OPP), polyethylene (=PE) or polyamide and including mixtures, laminates or other combinations of these. The metal can may be made from tinned steel plate or other metals such as aluminium. Preferably, the interior surface of the metal container is laminated with a plastic material or coated with a lacquer or with a varnish. The lacquer or varnish are such to protect the interior surface of the container from corrosion. The corrosion may lead to a weakening of the container and may also lead to a discoloration of the container's content. Preferred plastic materials for lamination and lacquers or varnishes for coating are epoxy phenolic, polyamide imide, organosol, PET, PP, PE or a combination thereof.

The container or can further comprises an opening (12), preferably in the top portion (14) of the container. Preferably, the opening is along the axis (A) of the container. The axis (A) is hereinafter the axis perpendicular to the support upon which the container stands in its upright position and passing in the middle of the container as shown in FIG. 1. The opening is closed by a valve. The valve has an open position and a closed position. The closed position of the valve prevents any substantial escape of product or propellant from the container. The open position of the valve allows the discharge of the product together with the propellant from the container. The dimension of the opening is given when the valve is in the open position. Preferably, the valve is in the open position when the valve is activated, for example by applying an external pressure. The pressing on the valve may exerted in any direction, for example by pressing the valve along the axis (A) and/or by tilting the valve in any other direction not parallel to the axis (A). The container and consequently also the valve according to the present invention preferably should sustain an internal pressure created inside the container by a propellant.

Another essential feature of the present invention is a nozzle (20). The nozzle is preferably attached to the container or to the valve. The nozzle comprises a discharge opening (21) and a channel (22). The nozzle is attached to the container such that the channel extends from the valve of the container and the wall (22a) surrounding the channel is connected to the valve. By pressing on the nozzle the valve is opened allowing the product to be expelled through the opening (12) of the container. Preferably, the nozzle comprises a valve actuator (23). When pressing on the valve actuator the valve is opened and the product is allowed to exit the container. The valve actuator may directly or indirectly act on the valve to open it. Preferably, the valve actuator acts indirectly on the valve. For example, when the valve actuator is pressed, the valve actuator may first displace the wall (22a) surrounding the channel, and then this displacement of the wall acts on the valve opening it, since this wall is connected to the valve. In this manner, it is ensured that the channel always extends from the valve regardless of the direction in which the valve actuator is pressed. As a preferred option, the valve actuator is movable with respect to the rest of the nozzle along a hinge. Alternatively, the whole nozzle can be movable along a hinge at the attachment with the container.

The channel (22) connects the opening (12) of the container to the discharge opening (21) of the nozzle when the valve is in the open position. This means that the foaming product expelled through the opening (12) when the valve is in the open position passes through this channel to reach the discharge opening of the nozzle. The way up to the discharge opening is still propelled by the propellant exiting together with the foaming product from inside the container. According to the present invention the channel is straight, continuous and uninterrupted all along its length between the opening (12) and the discharge opening (21). In the following, a "straight, continuous channel" means that the channel between the opening (12) of the container and the discharge opening (21) of the nozzle is along its whole length parallel to the axis (A). This means that the opening (12) of the container and the discharge opening (21) of the nozzle are substantially aligned along a direction parallel to the axis (A). This further means that the channel does not include any bend of greater than 45° deg along its whole length, more preferably not greater than 30° deg. Most preferably the channel is substantially straight and without bends in the region between the valve and the discharge opening. The angle of the bend is measured between the axis (A) and the direction of the channel. As hereinafter referred to "uninterrupted" means that no obstacles, such as e.g. constrictions in the cross-sectional area of the channel, or meshes or grilles, are provided along the whole length of the channel.

This specific form of the nozzle (20) is such to substantially minimise that foams discharged with gaseous propellants tend to exhibit a greater increase in foam density throughout the life of the aerosol container compared to foams discharged with liquid propellants. Indeed, it is observed that the foam density of the foaming product when the aerosol package is almost empty is still slightly higher than the foam density of the product first discharged when the aerosol container was still full. However, we do observe that the foam density of the foaming product when the aerosol package is almost empty is lower when the channel of the nozzle is straight continuous and uninterrupted all along its length when compared to other nozzles of the prior art. Therefore, the increase of foam density of the discharged product throughout the life of the aerosol container is minimised with the nozzle according to the present invention.

The applicant has found that the undesirable increase of foam density is worse when the nozzle creates turbulence and/or shear during the discharging of the product. The nozzle according to the present invention reduces the turbulances and/or shear during the discharging of the product. The applicant has found that turbulence and/or shear can be reduced and/or minimised by removing any obstacles to the product flow through the channel and making the channel straight and continuous. In particular, the turbulence and/or shear can be minimised by having a straight, continuous and uninterrupted channel avoiding any bends, expansion chambers, side channels or obstacles. Furthermore, it has been found that the turbulence and/or shear during the discharge of the product with the propellant can be further reduced by increasing the dimension of the opening (12) of the container when the valve is in the open position. Indeed, it has been found that a commercially available valve (from Precision Valve Co.) having three orifices with a diameter of about 1.3 mm (0.050 inch) has a reduced turbulence and/or shear compared to another commercially available valve (also from Precision Valve Co.) having only one orifice with a diameter of only 0.33 mm (0.013 inch).

In the following, "substantially smooth" means an average surface roughness of less than 1 mm, preferably less than 100 μm, most preferably less than 10 μm. In the following, "wide" means an average channel diameter greater than 2 mm, preferably greater than 4 mm, most preferably greater than 6 mm. In the following, "short" means a channel length of less than 10 cm, preferably less than 5 cm, more preferably less than 3 cm, most preferably less than 1 cm. Preferably, other possibilities to further reduce the turbulence during the product flow in the channel are selected from the group consisting of:

(1) the wall of the tube surrounding the channel being substantially smooth;

(2) an opening (12) being wide when the valve is in the open position;

(3) a channel being short;

(4) no grids or meshes in the channel and/or at the discharging opening;

(5) a slightly conical channel whereby the channel becomes gradually wider as the product flows along the channel towards the discharging opening;

(6) a combination thereof.

The nozzle (20) may in a preferred embodiment further comprise an overcap (25). When the nozzle with the overcap is applied on the container, the overcap covers the channel (22) and only the discharging opening (21) is visible from outside when the nozzle is made of a non-transparent material. When the nozzle comprises the overcap, the valve actuator (23) is preferably located in a recess on the overcap. As before, by pressing onto the actuator the valve is opened and product is discharged through the discharging opening. The actuator may preferably be connected to the overcap with the hinge. In this manner the actuator is movable with respect to the rest of the overcap.

Preferably, the nozzle (20) is made of thermoplastic material. Such thermoplastic materials have been extensively described in the art and include vinyl chloride based resins, polymers and co-polymers derived from olefins, acrylic polymers and co-polymers, polyethylene, polypropylene, polystyrene, polyethylene terephthalate, polyethylene terephthalate glycol, or mixtures thereof. The nozzle can be made of single or multi-layer extrusion of such materials. It can also comprise recycled thermoplastic materials. A preferred thermoplastic material used herein is polypropylene. Different parts of the nozzle, like the channel (22), the valve actuator (23) or the overcap (25), may be made of a different thermoplastic material than the rest of the nozzle. Parts of different thermoplastic material may be co-injected together.

Preferably, the nozzle (20) is made as a single piece in an injection moulding process also when the nozzle comprises the overcap (25). Preferably, the nozzle according to the present invention can be made in a standard open and shut mould without the need for any additional part for the moulding. This means that only a two piece mould is needed to manufacture the nozzle according to the present invention. On the contrary, an additional part increases the parts of the mould to a three piece mould. A nozzle manufactured with a three piece mould is, for example, disclosed in WO-94/27890. Needing a two piece mould instead of a three piece mould simplifies the manufacturing process of the nozzle. This simplification of the manufacturing process is very important, since the manufacturing costs of the nozzle are thereby reduced. Indeed, a moulding with a standard open and shut mould is less expensive than a three piece mould.

The container contains a propellant and a product. The propellant helps to discharge the product from inside the container. Furthermore, the propellant expands to form many "bubbles" within the composition thereby creating the foam. The quantity of propellant contained in the container is such to that substantially all the product can be expelled out of the container throughout the life of the aerosol package at the correct pressure. The quantity also depends from the type of propellant used.

According to the present invention the propellant is a gaseous propellant. As herein referred to, the words "gaseous" and "non-liquifiable" are used interchangeably in regard to the propellant. Indeed, gaseous propellants or non-liquifiable propellants are propellants which are in a gaseous state of matter at room temperature (about 20° C.) and at pressures up to 12 bar. Furthermore, it is preferred to use 'ozone-friendly' propellants such as compressed air, carbon dioxide, nitrogen and oxides thereof or mixtures thereof. Carbon dioxide is the more preferred gaseous propellant according to the present invention. Minor amounts of low molecular weight hydrocarbons, such as propane, butane, pentane, hexane, may optionally be included provided that flammability requirements are not exceeded.

The gaseous propellant is preferably present at a level of at least 1% by weight of the total container's content, more preferably at a level between 2% and 5% by weight of the total containers content, most preferably at a level between 3% and 4% by weight of the total containers content. The pressure inside the container created by the gaseous propellant is preferably at least 5 bar at 20° C., more preferably the inside pressure is in the range between 8 bar and 10 bar at 20° C.

Various ways to pressurise the propellant gas are known in the art. For example the gas may be pressurised at the time of packing. The product may be physically separated from a compressed gas by a membrane such as rubber under tension. Alternatively a means for pressurising the gas subsequently by mechanical action may be provided (so-called "pump and spray" systems).

The product foams when discharged through the nozzle (20) with the aid of the gaseous propellant. The gaseous propellant expands to form many bubbles within the composition thereby creating the foam. Specific hard surface cleaners are examples of foaming products. Such a foaming product is disclosed, for example, in EP-A-546 828. A preferred foaming product according to the present invention is a foaming laundry cleaning detergent. A foaming laundry cleaning composition is disclosed in EP-A-677 577 and in the co-pending European Patent Application No. 95870084.1 from which priority is claimed. This particular foaming laundry cleaning detergent will now be described in more detail.

Water-soluble salts of the higher fatty acids, i.e., "soaps", are useful anionic surfactants in the compositions herein. This includes alkali metal soaps such as the sodium, potassium, ethanolamine, ammonium, and alkylammonium salts of higher fatty acids containing from about 8 to about 24 carbon atoms, and preferably from about 12 to about 18 carbon atoms. Soaps can be made by direct saponification of fats and oils or by the neutralization of free fatty acids. Particularly useful are the ethanolamine, sodium and potassium salts of the mixtures of fatty acids derived from coconut oil and tallow, i.e., monoethanolamine, sodium or potassium tallow and coconut soap.

Useful anionic surfactants also include the water-soluble salts, preferably the alkali metal, ethanolamine, ammonium and alkylolammonium salts, of organic sulfuric reaction products having in their molecular structure an alkyl group containing from about 10 to about 20 carbon atoms and a sulfonic acid or sulfuric acid ester group. (Included in the term "alkyl" is the alkyl portion of acyl groups.) Examples of this group of synthetic surfactants are the alkyl sulfates, especially those obtained by sulfating the higher alcohols ($C_8$–$C_{18}$ carbon atoms) such as those produced by reducing the glycerides of tallow or coconut oil; and the alkyl benzene sulfonates in which the alkyl group contains from about 9 to about 15 carbon atoms, in straight or branched chain configuration, e.g., those of the type described in U.S. Pat. Nos. 2,220,099 and 2,477,383; and methyl ester sulphonates. Especially valuable are linear straight chain alkyl benzene sulfonates in which the average number of carbon atoms in the alkyl group is from about 11 to 13, abbreviated as $C_{11}$–$C_{13}$ LAS.

Other anionic surfactants herein are the alkyl glyceryl ether sulfonates, especially those ethers of higher alcohols derived from tallow and coconut oil; coconut oil fatty acid monoglyceride sulfonates and sulfates; salts of alkyl phenol ethylene oxide ether sulfates containing from about 1 to about 10 units of ethylene oxide per molecule and wherein the alkyl groups contain from about 8 to about 12 carbon atoms; and salts of alkyl ethylene oxide ether sulfates containing from about 1 to about 10 units of ethylene oxide per molecule and wherein the alkyl group contains from about 10 to about 20 carbon atoms.

Other useful anionic surfactants herein include the water-soluble salts of esters of alpha-sulfonated fatty acids containing from about 6 to 20 carbon atoms in the fatty acid group and from about 1 to 10 carbon atoms in the ester group; water-soluble salts of 2-acyloxy-alkane-1-sulfonic acids containing from about 2 to 9 carbon atoms in the acyl group and from about 9 to about 23 carbon atoms in the alkane moiety; alkyl ether sulfates containing from about 10 to 20 carbon atoms in the alkyl group and from about 1 to 30 moles of ethylene oxide; watersoluble salts of olefin sulfonates containing from about 12 to 24 carbon atoms; and beta-alkyloxy alkane sulfonates containing from about 1 to 3 carbon atoms in the alkyl group and from about 8 to about 20 carbon atoms in the alkane moiety.

Water-soluble non-ionic surfactants are also useful as surfactants in the compositions of the invention. Indeed, preferred processes use anionic/non-ionic blends. Such non-ionic materials include compounds produced by the condensation of alkylene oxide groups (hydrophilic in nature) with an organic hydrophobic compound, which may be aliphatic or alkyl aromatic in nature. The length of the polyoxyalkylene group which is condensed with any particular hydrophobic group can be readily adjusted to yield a water-soluble compound having the desired degree of balance between hydrophilic and hydrophobic elements.

Suitable non-ionic surfactants include the polyethylene oxide condensates of alkyl phenols, e.g., the condensation products of alkyl phenols having an alkyl group containing from about 6 to 16 carbon atoms, in either a straight chain or branched chain configuration, with from about 4 to 25 moles of ethylene oxide per mole of alkyl phenol.

Preferred non-ionics are the water-soluble condensation products of aliphatic alcohols containing from 8 to 22 carbon atoms, in either straight chain or branched configuration, with from 1 to 25 moles of ethylene oxide per mole of alcohol, especially 2 to 7 moles of ethylene oxide per mole of alcohol. Particularly preferred are the condensation products of alcohols having an alkyl group containing from about 9 to 15 carbon atoms; and condensation products of propylene glycol with ethylene oxide.

Other preferred non-ionics are polyhydroxy fatty acid amides which may be prepared by reacting a fatty acid ester and an N-alkyl polyhydroxy amine. The preferred amine for use in the present invention is N-(R1)-CH2(CH2OH)4-CH2-OH and the preferred ester is a C12–C20 fatty acid methyl ester. Most preferred is the reaction product of N-methyl glucamine (which may be derived from glucose) with C12–C20 fatty acid methyl ester.

Methods of manufacturing polyhydroxy fatty acid amides have been described in WO 9206073, published on Apr. 16, 1992. This application describes the preparation of polyhydroxy fatty acid amides in the presence of solvents. In a highly preferred embodiment of the invention N-methyl glucamine is reacted with a C12–C20 methyl ester.

Semi-polar non-ionic surfactants include water-soluble amine oxides containing one alkyl moiety of from about 10 to 18 carbon atoms and 2 moieties selected from the group consisting of alkyl groups and hydroxyalkyl groups containing from 1 to about 3 carbon atoms; water-soluble phosphine oxides containing one alkyl moiety of about 10 to 18 carbon atoms and 2 moieties selected from the group consisting of alkyl groups and hydroxyalkyl groups containing from about 1 to 3 carbon atoms; and water-soluble sulfoxides containing one alkyl moiety of from about 10 to 18 carbon atoms and a moiety selected from the group consisting of alkyl and hydroxyalkyl moieties of from about 1 to 3 carbon atoms.

Ampholytic surfactants include derivatives of aliphatic or aliphatic derivatives of heterocyclic secondary and tertiary amines in which the aliphatic moiety can be either straight or branched chain and wherein one of the aliphatic substituents contains from about 8 to 18 carbon atoms and at least one aliphatic substituent contains an anionic water-solubilizing group.

Zwitterionic surfactants include derivatives of aliphatic quaternary ammonium phosphonium, and sulfonium compounds in which one of the aliphatic substituents contains from about 8 to 18 carbon atoms.

Useful cationic surfactants include water-soluble quaternary ammonium compounds of the form $R_4R_5R_6R_7N^+X^-$, wherein $R_4$ is alkyl having from 10 to 20, preferably from 12–18 carbon atoms, and $R_5$, $R_6$ and $R_7$ are each $C_1$ to $C_7$ alkyl preferably methyl; $X^-$ is an anion, e.g. chloride. Examples of such trimethyl ammonium compounds include $C_{12-14}$ alkyl trimethyl ammonium chloride and cocalkyl trimethyl ammonium methosulfate.

Other surfactants that may be used in the compositions of the present invention include C10–C18 glycerol ethers, C10–18 alkyl polyglycoside and their corresponding sulphated polyglycosides, alkyl ester sulphonates, and oleoyl sarcosinate.

Enzymes can be included in the foaming compositions herein for a wide variety of fabric laundering purposes, including removal of protein-based, carbohydrate-based, or triglyceride-based stains, for example, and for the prevention of refugee dye transfer, and for fabric restoration. The enzymes to be incorporated include proteases, amylases, lipases, cellulases, and peroxidases, as well as mixtures thereof. Other types of enzymes may also be included. They may be of any suitable origin, such as vegetable, animal, bacterial, fungal and yeast origin. However, their choice is governed by several factors such as pH-activity and/or stability optima, thermostability, stability versus active detergents, builders and so on. In this respect bacterial or fungal enzymes are preferred, such as bacterial amylases and proteases, and fungal cellulases.

Enzymes are normally incorporated at levels sufficient to provide up to about 5 mg by weight, more typically about 0.01 mg to about 3 mg, of active enzyme per gram of the composition. Stated otherwise, the compositions herein will typically comprise from about 0.001% to about 5%, preferably 0.01%–1% by weight of a commercial enzyme preparation. Protease enzymes are usually present in such commercial preparations at levels sufficient to provide from 0.005 to 0.1 Anson units (AU) of activity per gram of composition.

Suitable examples of proteases are the subtilisins which are obtained from particular strains of *B. subtilis* and *B. licheniforms*. Another suitable protease is obtained from a strain of Bacillus, having maximum activity throughout the pH range of 8–12, developed and sold by Novo Industries A/S under the registered trade name ESPERASE. The preparation of this enzyme and analogous enzymes is described in British Patent Specification No. 1,243,784 of Novo. Proteolytic enzymes suitable for removing protein-based stains that are commercially available include those sold under the tradenames ALCALASE and SAVINASE by Novo Industries AIS (Denmark) and MAXATASE by International Bio-Synthetics, Inc. (The Netherlands). Other proteases include Protease A (see European Patent Application 130,756, published Jan. 9, 1985) and Protease B (see European Patent Application Serial No. 87303761.8, filed Apr. 28, 1987, and European Patent Application 130,756, Bott et al, published Jan. 9, 1985).

Amylases include, for example, α-amylases described in British Patent Specification No. 1,296,839 (Novo), RAPIDASE, International Bio-Synthetics, Inc. and TERMAMYL, Novo Industries.

The cellulase usable in the present invention include both bacterial or fungal cellulase. Preferably, they will have a pH optimum of between 5 and 9.5. Suitable cellulases are disclosed in U.S. Pat. No. 4,435,307, Barbesgoard et al, issued Mar. 6, 1984, which discloses fungal cellulase produced from Humicola insolens and Humicola strain DSM1800 or a cellulase 212-producing fungus belonging to the genus Aeromonas, and cellulase extracted from the hepatopancreas of a marine mollusk (Dolabella Auricula Solander). suitable cellulases are also disclosed in GB-A-2.075.028; GB-A-2.095.275 and DE-OS-2.247.832. CAREZYME (Novo) is especially useful.

Suitable lipase enzymes for detergent usage include those produced by microorganisms of the Pseudomonas group, such as *Pseudomonas stutzeri* ATCC 19.154, as disclosed in British Patent 1,372,034. See also lipases in Japanese Patent Application 53,20487, laid open to public inspection on Feb. 24, 1978. This lipase is available from Amano Pharmaceutical Co. Ltd., Nagoya, Japan, under the trade name Lipase P "Amano," hereinafter referred to as "Amano-P." Other commercial lipases include Amano-CES, lipases ex Chromobacter viscosum, e.g. Chromobacter viscosum var. lipolyticum NRRLB 3673, commercially available from Toyo Jozo Co., Tagata, Japan; and further Chromobacter viscosum lipases from U.S. Biochemical Corp., U.S.A. and Disoynth Co., The Netherlands, and lipases ex *Pseudomonas gladioli*. The LIPOLASE enzyme derived from *Humicola lanuginosa* and commercially available from Novo (see also EPO 341,947) is a preferred lipase for use herein.

Peroxidase enzymes are used in combination with oxygen sources, e.g., percarbonate, perborate, persulfate, hydrogen peroxide, etc. They are used for "solution bleaching," i.e. to prevent transfer of dyes or pigments removed from substrates during wash operations to other substrates in the wash solution. Peroxidase enzymes are known in the art, and include, for example, horseradish peroxidase, ligninase, and haloperoxidase such as chloro- and bromo-peroxidase. Peroxidase-containing detergent compositions are disclosed, for example, in PCT International Application WO 89/099813, published Oct. 19, 1989, by O. Kirk, assigned to Novo Industries A/S.

A wide range of enzyme materials and means for their incorporation into synthetic detergent compositions are also disclosed in U.S. Pat. No. 3,553,139, issued Jan. 5, 1971 to McCarty et al. Enzymes are further disclosed in U.S. Pat. No. 4,101,457, Place et al, issued Jul. 18, 1978, and in U.S. Pat. No. 4,507,219, Hughes, issued Mar. 26, 1985, both. Enzyme materials useful for liquid detergent formulations, and their incorporation into such formulations, are disclosed in U.S. Pat. No. 4,261,868, Hora et al, issued Apr. 14, 1981. Enzymes for use in detergents can be stabilized by various techniques. Enzyme stabilization techniques are disclosed and exemplified in U.S. Pat. No. 3,600,319, issued Aug. 17, 1971 to Gedge, et al, and European Patent Application Publication No. 0 199 405, Application No. 86200586.5, published Oct. 29, 1986, Venegas. Enzyme stabilization systems are also described, for example, in U.S. Pat. No. 3,519,570.

The foam of the present invention can contain neutral or alkaline salts which have a pH in solution of seven or greater, and can be either organic or inorganic in nature. The builder salt assists in providing the desired density and bulk to the detergent granules herein. While some of the salts are inert, many of them also function as detergency builder materials in the laundering solution.

Examples of neutral water-soluble salts include the alkali metal, ethanolamine, ammonium or substituted ammonium chlorides, fluorides and sulfates. The sodium, ethanolamine and ammonium salts of the above are preferred. Citric acid and, in general, any other organic or inorganic acid may be incorporated into the present invention.

Other useful water-soluble salts include the compounds commonly known as detergent builder materials. Builders are generally selected from the various water-soluble, alkali metal, ethanolamine, ammonium or substituted ammonium phosphates, polyphosphates, phosphonates, polyphosphonates, carbonates, silicates, borates, and polyhydroxysulfonates. Preferred are the sodium, ethanolamine and ammonium salts of the above.

Specific examples of inorganic phosphate builders are sodium and potassium tripolyphosphate, pyrophosphate, polymeric metaphosphate having a degree of polymerization of from about 6 to 21, and orthophosphate. Examples of polyphosphonate builders are the salts of ethylene diphosphonic acid, the salts of ethane 1-hydroxy-1,1-diphosphonic acid and the salts of ethane, 1,1,2-triphosphonic acid. Other phosphorus builder compounds are disclosed in U.S. Pat. Nos. 3,159,581; 3,213,030; 3,422,021; 3,422,137; 3,400,176 and 3,400,148, incorporated herein by reference. In general, however, phosphates are preferably avoided for environmental reasons.

Examples of nonphosphorus, inorganic builders are sodium and potassium carbonate, bicarbonate, sesquicarbonate, tetraborate decahydrate, and silicate having a molar ratio of $SiO_2$ to alkali metal oxide of from about 0.5 to about 4.0, preferably from about 1.0 to about 2.4.

Another component of the foaming compositions useful herein comprises nonaqueous, viscosity by reducing, organic solvent (s). The term "solvent" is used herein to connote non-surface active or low surface active materials that dissolve into the detergent composition matrix having a viscosity reduction effect on the composition. This effect is generally a result of their interaction with the surfactant-water system present in the formulations preventing the formation of liquid crystal phases. The term "solvent" is not meant to require that the solvent material be capable of actually dissolving all of the detergent composition components added thereto.

The non-aqueous organic materials which are employed as solvents herein can be liquids of high or low polarity. High polarity liquids, suitable as solvents are for example short chain alcohols (ethanol, propanol, propane-diol, etc), short chain aldehydes (methylal, acetaldehyde, etc), short chain ketones (acetone, propanone, etc) and short chain ethers.

Other polar materials useful in some cases are glycerols, glycols and short chain ethoxylated alcohols (short chain non-ionic surfactants).

The short chain non-ionic surfactants for use herein are alkoxylated alcohols according to the formula:

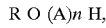

wherein R is a C6 to C10 straight or branched, hydrocarbon chain and n, representing the average ethoxylation degree, is from 1 to 10, or mixtures thereof. A is ethylene oxide or propylene oxide or mixtures thereof.

Suitable surfactants for use herein can readily be made by condensing alcohols having the desired chain length with propylene or ethylene oxide, or mixtures thereof. Suitable short chain alkoxylated for use herein are commercially available from several suppliers, for example Dehydrol O4® from Henkel (C8EO4), Mergital C4® from Sidobre (C8EO4), and Imbentin AG/810/050® and AG/810/080® from Kolb (respectively C8-10EO5 and C8-10EO8).

Suitable types of low-polarity solvents useful in the nonaqueous liquid detergent compositions herein include alkylene glycol mono lower alkyl ethers, lower molecular weight polyethylene glycols, lower molecular weight methyl esters and amides, and the like.

A preferred type of nonaqueous, low-polarity solvent for use herein comprises the mono-, di-, tri-, or tetra-$C_2$–$C_3$ alkylene glycol mono $C_2$–$C_6$ alkyl ethers. The specific examples of such compounds include diethylene glycol monobutyl ether, tetraethylene glycol monobutyl ether, dipropoyene glycol monoethyl ether, and dipropylene glycol monobutyl ether. Diethylene glycol monobutyl ether and dipropylene glycol monobutyl ether are especially preferred. Compounds of the type have been commercially marketed under the tradenames Dowanol, Carbitol, and Cellosolve.

Another preferred type of nonaqueous, low-polarity organic solvent useful herein comprises the lower molecular weight polyethylene glycols (PEGs). Such materials are those having molecular weights of at least about 150. PEGs of molecular weight ranging from about 200 to 600 are most preferred.

Yet another preferred type of non-polar, nonaqueous solvent comprises lower molecular weight methyl esters. Such materials are those of the general formula: $R^1$—C(O)—$OCH_3$ wherein $R^1$ ranges from 1 to about 18. Examples of suitable lower molecular weight methyl esters include methyl acetate, methyl propionate, methyl octanoate, and methyl dodecanoate.

The nonaqueous, organic solvent(s) employed should, of course, be compatible and non-reactive with other composition components, used in the foaming compositions herein. Such a solvent component will generally be utilized in an amount of from about 1% to 60% by weight of the composition. More preferably, the nonaqueous, organic solvent will comprise from about 5% to 40% by weight of the composition, most preferably from about 10% to 25% by weight of the composition.

Foam stabilising agents may also be employed in the compositions of the present invention. Especially preferred are alyphatic alcohols such as straight chain saturated alcohols of 12 to 18 carbon atoms e.g. cetyl alcohol, stearyl alcohol, myristyl alcohol and mixtures thereof. Polymers including polyvinylpyrrolidone, polyvinyl alcohol, polyacrylamide, polypeptides, polysaccharides, cellulose derivatives; and also natural and synthetic gums and resins such as guar gum, xanthan gum, carageenan, sodium alginate and caseinate may also be used in the present invention.

Textile fabrics are any materials made from cloth, including garments such as shirts, blouses, socks, skirts, trousers, jackets, underwear etc, and also including tablecloths, towels, curtains etc. The definition of textile fabrics as used herein does not include carpets and similar floor coverings.

Textile fabrics which are to be used in the present invention are commonly made by weaving or knitting. Many different fibres may be used to produce woven, knitted or other types of textile fabric including synthetic fibres (such as polyester, polyamide, etc.) and natural fibres from plants (such as cotton, hemp) and from animals (such as wool, angora, silk). Blends of different fibres are also commonly used.

It is important to distinguish between the foam of the present invention and the suds which are commonly encountered in everyday washing process. The foam of the present invention is much more concentrated and comprises less water than conventional suds. The foam of the present invention comprises preferably less than 25%, and more preferably less than 15% by weight of water. The foam of the present invention preferably comprises at least 18% by weight, and preferably at least 25% by weight of a surface active agent. Most preferred foams for use as cleaning compositions comprise at least 10% by weight, preferably at least 20% by weight of anionic surfactant.

On the other hand, suds, which are formed in conventional washing process when detergents are diluted prior to washing, are formed from quite dilute solutions typically 100 g of product in 10 liters of water. The result is a wash liquor which comprises about 99% by weight of water. A layer of suds may form on the surface of the wash liquor, the composition of the suds being similar to that of the wash liquor itself. The surfactant content of the suds will normally be much less than 1%, typically less than 0.3%.

Consequently the difference between the foam of the present invention and the suds of a conventional washing process will be understood.

It will also be recognised by the man skilled in the art that suds are often considered undesirable in the washing process and antisuds agents are often employed to reduce or control them. In a washing process in which the solution of detergent active agents is the medium of transport of the actives to the fibre surface, the presence of suds can diminish washing performance. This is because the detergent actives which are in the suds are no longer dissolved in the washing liquor itself, and are not therefore efficiently transported to the fibre surface.

In order for the aerosol package to be effective in the distribution of the foaming product, the aerosol package according to the present invention should deliver the foaming product at a rate of at least 3 g per second of foam from the container, more preferably at a rate of at least 10 g per second.

Method of Cleaning
Handwash

The method of the present invention may be used to wash textile fabrics by hand (referred to herein as "handwash"). The foam is dispensed onto or around the textile fabrics to be washed, and then the foam is thoroughly distributed over the textile fabrics, if necessary, by agitating the textile fabrics and foam by hand. It is believed that the high surface area of the foam enables the active ingredients to be well-distributed over the surface of the textile fabrics. Furthermore it is believed that the intimate proximity of the active, non-diluted foam to the textile fabrics promotes excellent cleaning.

The textile fabrics may be left to soak in the foam for anything up to several days, or even weeks. However it is preferred that the soaking time is between 1 minute and 24 hours, preferably between 5 minutes and 4 hours.

If desired any foam residue may subsequently be removed from the textile fabrics. For example the residue may be rinsed out using clean water or it may be removed from the textile fabrics by applying a vacuum.

The method of the present invention is particularly well-suited to hand washing of delicate textile fabrics. In particular textile fabrics comprising high levels of wool or silk may be advantageously treated in this way. One particular benefit is a marked reduction in local fabric damage which may occur when conventional laundry processes are used. In conventional laundry processes the composition, the soiled textile fabrics and water are all brought together in a suitable container. At the beginning of the process there are very high local concentrations of active ingredients as they begin to dissolve in the water, but before they have been homogeneously distributed in the water. Such high local concentrations in solution, if they happen to be present on or close to the fabric can cause local fabric damage. This is especially true in the case of high local concentrations of bleaching agents and optical brighteners in solution. This type of local fabric damage is avoided according to the method of the present invention. Because all of the active ingredients are uniformly distributed throughout the large volume of the foam there are no local concentrations of active materials which might cause fabric damage.

A typical handwash composition will comprise some or all of the following components: surfactants (anionic, non-ionic, cationic, amphoteric, zwitterionic), detergent builders and chelating agents, soil release polymers, optical brightener, dye transfer inhibition polymer, perfume, enzymes, colorants.

Surfactants are preferably present at a level of from 10% to 90% by weight of the composition, preferably 20% to 80% of the composition, more preferably from 25% to 50% of the composition and most preferably about 30% by weight of the composition.

Detergent builders such as fatty acids, citric acid, succinic acid, phosphate, zeolite are preferably present at a level of from 10% to 90% by weight of the composition, preferably 10% to 50% of the composition, more preferably from 12% to 20% by weight of the composition.

Chelating agent such as phosphonate are preferably present at a level of from 0% to 5%, more preferably from 0.1% to 3% by weight of the composition.

Machine wash

The method of the present invention may be used to wash textile fabrics in a conventional washing machine or, alternatively, if no added water is required, in a conventional drying machine (both cases referred to herein as "machine wash"). The foam of the present invention is simply dispensed into the drum of the machine either before or after the soiled textile fabrics have been loaded.

Most commercially available washing machines have automatic washing cycles, and many of these cycles start by the addition of water into the machine drum. However, to fall within the scope of the present invention it is necessary for the concentrated foam to be thoroughly dispersed over the textile fabrics without being dissolved in solution. Preferably this is achieved using a washing machine with a washing cycle in which the drum is rotated several times (thereby distributing the foam) before any water is added. However, this does not exclude the step of presoaking the textile fabrics prior to the treatment with the foam from the present invention.

If water is to be added at a later part of the cycle most of the foam components will be dissolved or dispersed in the water, probably resulting in a layer of suds in the machine. As noted above, these suds which have a high water content and a low surfactant content should not be considered as foam within the meaning of the present invention.

The wash cycle may be completed by any combination of washing, rinsing, conditioning and/or drying steps, during any one of which additional wash or rinse additives may be introduced into the machine drum.

The compositions suitable for machine wash foams are similar to those described above for handwash foams.

Test Methods

A. Foam Density

A glass beaker, 62 mm internal height, 111 mm internal diameter, is degreased with a standard soap solution and well rinsed with distilled water. The beaker is filled with foam until overflowing, excess foam being immediately scraped off using a straight edge wiped across the top edge of the beaker. The difference in weight of the full beaker (W2) minus the empty beaker (W1) is the weight of foam. The volume of the beaker (V) is known. Foam density is calculated by (W2−W1)/V.

B. Foam Stability in Air

A glass beaker, 62 mm internal height, 111 mm internal diameter, is degreased with a standard soap solution and well rinsed with distilled water. The beaker is filled with foam until overflowing, excess foam being immediately scraped off using a straight edge wiped across the top edge of the beaker.

The time taken for the foam to collapse to half the total volume of the glass beaker is an indication of the foam stability in air. In this test the time taken for the foam to collapse to half the height of the glass beaker is measured and recorded.

EXAMPLES

Liquid laundry compositions were prepared by mixing the components according to the compositions in Table 1. Then each composition was packed into metal containers, each container having a nominal capacity of 405 cubic centimeters. The cans were filled with 250 ml of liquid detergent and then were pressurised with carbon dioxide while shaking, until it equilibrates to a can pressure of about 10 bars of carbon dioxide at about 20° C.

All the cans are fitted with a 3×1.0 mm diameter standard valve (Code No. 045380 supplied by Valve Precision), without a dip tube and a straight whipped cream nozzle. In order to expel the foam out of the can, the can must be in an inverted position.

The cans were allowed to rest for a day at room temperature (about 20° C.) before the testing for the foam characteristics is performed. Immediately before the testing is done, the cans were shaken by hand to ensure homogeneity of the components inside the can. All foam densities and stabilities were measured based upon the first discharge of foam from the filled aerosol container.

The results of the methods described above are shown in Table 2.

TABLE 1

Liquid Matrix Compositions

| | 1 | 2 | 3 | 4 | 5 | 6 | 7 |
|---|---|---|---|---|---|---|---|
| Alkyl sulphate | 7.44 | 7.44 | 9.57 | 7.97 | 10.10 | 7.44 | 9.57 |
| Alkyl ethoxy sulphate | 6.38 | 6.38 | 8.20 | 6.84 | 8.66 | 6.38 | 8.20 |
| Non-ionic C12/C15 E7 | 10.62 | 10.62 | 13.65 | 11.38 | 14.41 | 10.62 | 13.65 |
| NMG | 4.06 | 4.06 | 5.22 | 4.35 | 5.51 | 4.06 | 5.22 |
| Fatty acid | 8.79 | 8.79 | 11.30 | 9.42 | 11.93 | 8.79 | 11.30 |
| Citric acid | 0.87 | 0.87 | 1.12 | 0.93 | 1.18 | 0.87 | 1.12 |
| Propane diol | 9.65 | 9.65 | 12.41 | 10.34 | 13.10 | 9.65 | 12.41 |
| Ethanol | 0.68 | 0.68 | 0.87 | 0.73 | 0.92 | 0.68 | 0.87 |
| Monoethanolamine | 7.52 | 7.52 | 9.67 | 8.06 | 10.21 | 7.52 | 9.67 |
| Ethoxylated TEP | 0.31 | 0.31 | 0.40 | 0.33 | 0.42 | 0.31 | 0.40 |
| Phosphonate | 1.34 | 1.34 | 1.72 | 1.44 | 1.82 | 1.34 | 1.72 |
| Soil release polymer | 0.15 | 0.15 | 0.19 | 0.16 | 0.20 | 0.15 | 0.19 |
| PVNO | 0.24 | 0.24 | 0.31 | 0.26 | 0.33 | 0.24 | 0.31 |
| Enzymes | 0.691 | 0.691 | 0.89 | 0.74 | 0.94 | 0.691 | 0.89 |
| CaCl2 | 0.020 | 0.020 | 0.03 | 0.02 | 0.03 | 0.020 | 0.03 |
| Boric acid | 4.500 | 4.500 | 5.79 | 4.82 | 6.11 | 4.500 | 5.79 |
| PTMS | 0.030 | 0.030 | 0.04 | 0.03 | 0.04 | 0.030 | 0.04 |
| Perfume | 1.200 | 1.200 | 1.54 | 1.29 | 1.63 | 1.200 | 1.54 |
| PEG 200 | 30.00 | 20.00 | 10.00 | | | | |
| Glycerol | | | | 25.00 | | 25.00 | |
| C8EO4 | | | | | 5.00 | 5.00 | |
| Methylal | | | | | | | 10.00 |
| Xanthan Gum | | | | | | | |
| Acetone | | | | | | | |
| Hexylene Glycol | | | | | | | |
| Amyl acetate | | | | | | | |
| Shellsol Degreaser 55 | | | | | | | |
| Water | 5.51 | 15.51 | 7.08 | 5.90 | 7.48 | 5.51 | 7.08 |
| TOTAL | 100 | 100 | 100 | 100 | 100 | 100 | 100 |

| | 8 | 9 | 10 | 11 |
|---|---|---|---|---|
| Alkyl sulphate | 9.51 | 9.57 | 9.57 | 9.57 |
| Alkyl ethoxy sulphate | 8.16 | 8.20 | 8.20 | 8.20 |
| Non-ionic C12/C15 E7 | 13.58 | 13.65 | 13.65 | 13.65 |
| NMG | 5.19 | 5.22 | 5.22 | 5.22 |
| Fatty acid | 11.24 | 11.30 | 11.30 | 11.30 |
| Citric acid | 1.11 | 1.12 | 1.12 | 1.12 |
| Propanediol | 12.34 | 12.41 | 12.41 | 12.41 |
| Ethanol | 0.87 | 0.87 | 0.87 | 0.87 |
| Monoethanolamine | 9.61 | 9.67 | 9.67 | 9.67 |
| Ethoxylated TEP | 0.40 | 0.40 | 0.40 | 0.40 |
| Phosphonate | 1.71 | 1.72 | 1.72 | 1.72 |
| Soil release polymer | 0.19 | 0.19 | 0.19 | 0.19 |
| PVNO | 0.31 | 0.31 | 0.31 | 0.31 |
| Enzymes | 0.88 | 0.89 | 0.89 | 0.89 |
| CaCl2 | 0.03 | 0.03 | 0.03 | 0.03 |
| Boric acid | 5.75 | 5.79 | 5.79 | 5.79 |
| PTMS | 0.04 | 0.04 | 0.04 | 0.04 |
| Perfume | 1.53 | 1.54 | 1.54 | 1.54 |
| PEG 200 | | | | |
| Glycerol | | | | |
| C8EO4 | | | | |
| Methylal | 10.00 | | | |
| Xanthan Gum | 0.50 | | | |
| Acetone | | 10.00 | | |
| Hexylene Glycol | | | 10.00 | |
| Amyl acetate | | | | 10.00 |
| Shellsol Degreaser 55 | | | | |
| Water | 7.04 | 7.08 | 7.08 | 7.08 |
| TOTAL | 100 | 100 | 100 | 100 |

NMG is C12/C14 N-methyl glucamide.
Ethoxylated TEP is ethoxylated tetraethylenpentamine.
PVNO is polyvinylpyridin-N-oxide.
PTMS is propyl trimethoxysilane.

ShellSol Degreaser 55 is a blend of 95 C9–C11 isoparafins and 5% aliphatic C7-ester plus a corrosion protection agent, commercially sold by Shell Chemicals.

C8EO4 is Dehydrol® supplied by Henkel.

TABLE 2

Summary of Results

|  | 1 | 2 | 3 | 4 | 5 | 6 | 7 |
|---|---|---|---|---|---|---|---|
| Liquid Matrix | | | | | | | |
| Surfactant (%) | 36.44 | 36.44 | 43.42 | 38.19 | 45.17 | 36.44 | 43.42 |
| Water (%) | 5.51 | 15.51 | 7.08 | 5.90 | 7.48 | 5.51 | 7.08 |
| Viscosity (mPa.s) | 264 | 180 | 451 | 610 | 470 | 450 | 175 |
| Foam properties | | | | | | | |
| Density (g/L) | 78 | 95 | 100 | 107 | 80 | 108 | 66 |
| Stability (min) | 8.0 | 11.0 | n.a. | 18.0 | 11.0 | 9.0 | 1.7 |
| Empty Can | Yes | Yes | Yes | Yes | Yes | Yes | Yes |

|  | 8 | 9 | 10 | 11 |
|---|---|---|---|---|
| Liquid Matrix | | | | |
| Surfactant (%) | 43.25 | 43.42 | 43.42 | 43.42 |
| Water (%) | 7.04 | 7.08 | 7.08 | 7.08 |
| Viscosity (mPa.s) | 260 | 114 | 234 | 224 |
| Foam properties | | | | |
| Density (g/L) | 78 | 70 | 78 | 78 |
| Stability (min) | 10.0 | 1.2 | 5.0 | 2.5 |
| Empty Can | Yes | Yes | Yes | Yes |

For the purposes of these examples, a can was considered to be completely emptied if more than 80% by weight of the contents was discharged. It is generally preferred however that at least 85% by weight, and preferably at least 90% by weight of the contents should be discharged.

It was further found that the package with the nozzle shown in FIG. 1 of the present invention filled with any of the compositions of Table 1 and with carbon dioxide as a propellant minimises the increase of foam density of the discharged compositions throughout the life of the aerosol container. To measure the foam density, the product is discharged from the aerosol package in substantially equal doses. With each dose the foam density of the discharged product is measured and the container is allowed to rest for a day at room temperature (about 20° C.) before discharging a subsequent dose. Immediately before the discharge of a dose, the aerosol package is shaken by hand to ensure homogeneity of the components inside the container.

We claim:

1. A packaged product, comprising:

a container having an opening closed by a valve;

a foaming detergent composition stored within said container comprising less than about 25% by weight of water, wherein said valve has an open position for dispensing said foaming composition from said container and a closed position for preventing escape of said foaming composition from said container;

a propellant gas stored within said container comprising at least one of carbon dioxide, nitrous oxides, or mixtures thereof;

a nozzle attached to said container having a channel with an average channel width greater than 6 mm, a channel length of less than 1 cm, an average surface roughness of less than 10 $\mu$m, and the channel increasing in width toward a discharge opening, said channel interconnecting said opening of said container and said discharge opening of said nozzle, wherein said channel is straight, continuous and uninterrupted along its length between said opening of said container and said discharge opening of said nozzle; and wherein greater than about 80% of said foaming detergent composition can be discharged from said container during use.

2. The packaged container of claim 1, wherein said foaming composition comprises less than about 15% by weight of water.

3. The packaged product of claim 2, wherein greater than about 90% of said foaming detergent composition can be discharged from said container during use.

4. The packaged product of claim 1, wherein said foaming composition further comprises between about 30% and about 90% of a surfactant having at least an anionic surfactant and from about 10% to about 90% of a detergent builder.

* * * * *